Figure 1:
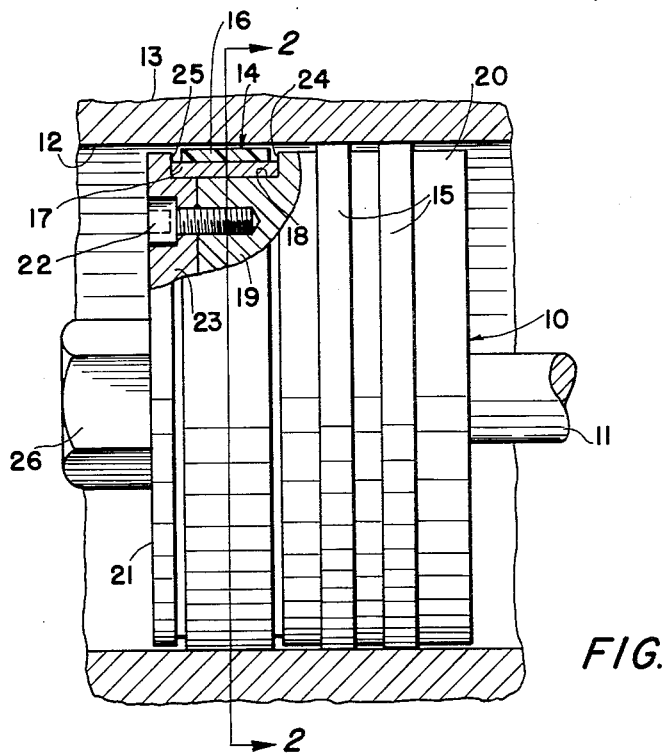

June 19, 1962 — F. D. HOWE — 3,039,834
PISTON WEAR DEVICE
Filed Feb. 27, 1961

INVENTOR
FRANK D. HOWE
BY
HIS ATTORNEY

United States Patent Office 3,039,834
Patented June 19, 1962

3,039,834
PISTON WEAR DEVICE
Frank D. Howe, Painted Post, N.Y., assignor to Ingersoll-Rand Company, New York, N.Y., a corporation of New Jersey
Filed Feb. 27, 1961, Ser. No. 92,024
3 Claims. (Cl. 309—14)

This invention relates to pistons and, more particularly, pertains to wear devices for reciprocating pistons.

In conventional reciprocating pistons for use in non-lubricating cylinders, the pistons are provided with a wear ring of carbon which is secured within an annular groove in the peripheral surface of the piston. It has been found that in some installations the attrition of the carbon wear rings was exceptionally rapid, thereby requiring frequent shutdowns for the replacement of the wear rings. It is not known precisely why in some compressor installations this excessive wear occurs, but it is suspected that it may be caused by exceptionally dry operating conditions due to the nature of the particular fluid being pumped and/or the detrimental effect of the fluid, under the heat generated and other operating factors, on the carbon which reduces its resistance to wear. In these installations it has been proposed to replace the carbon wear rings with material having self-lubricating characteristics (a low coefficient of friction) and having a higher resistance to wear than carbon, such as tetrafluorethylene polymer synthetic plastic, commercially known as Teflon. However, it was found that a Teflon ring of the same thickness as the replaced carbon wear ring caused binding on the cylinder resulting from the greater radial expansion of the Teflon than that of the same thickness of carbon. Therefore, due to the greater coefficient of expansion of the Teflon than carbon, a Teflon wear ring proved unsatisfactory. Furthermore, to allow for the substantially greater coefficient of expansion of Teflon as compared with carbon, the Teflon ring had to be provided with a width substantially less than that of the carbon wear device so that, while the piston ran cold, the Teflon ring slipped within the holding recess and produced knocking. In addition, a Teflon ring of the same size as a carbon ring is commercially undesirable since the cost of Teflon is substantially greater than that of carbon.

Accordingly, it is an object of the present invention to provide a relatively inexpensive wear device capable of replacing a carbon wear device and having self-lubricating characteristics and greater resistance to wear, chipping, and fracture than carbon wear rings.

Another object of this invention is to provide a wear device for replacing carbon wear rings, the installation of which wear device is accomplished easily, quickly, and without alteration of the piston to accommodate the device.

A further object of the present invention is to provide a wear device for replacing carbon wear rings, which device will not bind, upon radial expansion, on the cylinder walls.

Accordingly, the present invention contemplates a novel wear device adapted to replace conventional carbon wear rings, which device comprises an outer ring of material having self-lubricating characteristics and also resistant to wear, chipping, and fracture and an inner or backing ring on which the outer ring is superimposed in tight surface to surface contact. The inner ring is of a material having a coefficient of expansion which is less than the coefficient of expansion of the outer ring, but not so much less than the outer ring that, upon expansion, the outer ring will separate from the inner ring. The inner and outer rings are dimensioned in thickness in relation to their respective coefficients of expansion to provide a combined thickness substantially equal to the thickness of a carbon wear ring which it is to replace so that upon maximum thermal expansion of the device, it will not bind on the cylinder bore. It has been found preferable to construct the outer ring of tetrafluorethylene polymer synthetic plastic, commercially known as Teflon, and the inner ring of aluminum. It is also preferred to secure the Teflon ring to the aluminum ring by shrinking the Teflon ring on the aluminum ring.

Figure 2:
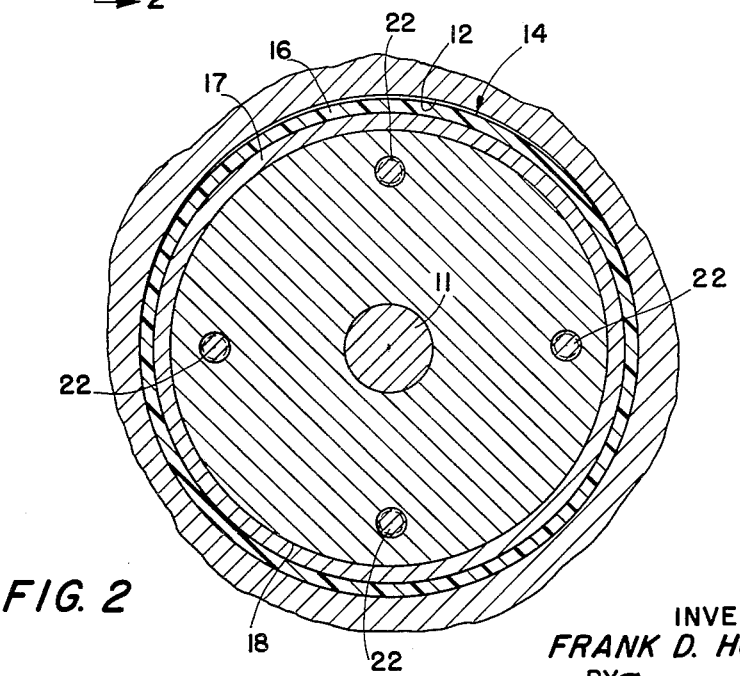

The invention will be more fully understood from the following description when considered in connection with the accompanying drawings in which:

FIGURE 1 is a side elevational view, partly in section of a portion of a compressor having a wear device according to this invention, and FIGURE 2 is a transverse view in section taken along line 2—2 of FIGURE 1.

Now referring to the drawings, the reference numeral 10 generally designates a piston of a conventional reciprocal compressor, which piston is operatively connected by means of piston rod 11 to a suitable prime mover (not shown) for reciprocable movement within the bore 12 of a non-lubricated cylinder 13. The piston 10 is of sufficiently smaller diameter than the bore 12 of the cylinder 13 to prevent contact therebetween when supported substantially coaxially in bore 12 by the wear device 14 according to this invention and hereinafter fully described. A pair of piston rings 15 are disposed in spaced annular grooves in the peripheral surface of the piston, which rings 15 bear against the surface of bore 12 to prevent fluid leakage through the space between piston 10 and the surface of bore 12.

Wear device 14 comprises an outer ring 16 which is superimposed on an inner ring 17. Outer ring 16 is composed of a material having a resistance to wear substantially that of the conventional carbon wear ring and having self-lubricating characteristics. Preferably outer ring 16 is composed of tetrafluorethylene polymer synthetic plastic, commercially known as Teflon, although any material having a relatively high resistance to wear and possessing self-lubricating characteristics may be used without departing from the scope and spirit of this invention. Outer ring 16 is preferably shrunk on inner ring 17 to secure the rings together, although it is within the purview of the present invention to secure rings 16 and 17 together in any other suitable manner, such as by swaging or bonding.

Inner ring 17 is composed of material having a coefficient of expansion less than the coefficient of expansion of outer ring 16, but not so much less than that of the material of which the outer ring is composed so that, upon radial expansion, the outer ring 16 and inner ring 17 will separate. Preferably, inner ring 17 is constructed of aluminum when outer ring 16 is composed of Teflon.

As best shown in FIG. 1, wear device 14 is secured within a peripheral recess 18 in the piston. Recess 18 is formed by a reduced end portion 19 of the body 20 of piston 10 and an end plate 21 secured to reduced end portion 19 by a plurality of circumferentially spaced bolts 22 (only one of which is shown in FIG. 1). End plate 21 is provided with a reduced end portion 23 of the same diametric dimension as end portion 19 of body 20 so that when end plate 21 is secured to end portion 19, the peripheral surfaces of end portion 23 of end plate 21 and end portion 19 of body 20 lie in coplanar relationship to each other. The reduced end portion 19 of body 20 and the reduced end portion 23 of end plate 21 provide shoulders 24 and 25, respectively, which form the side walls of recess 18.

As shown, inner ring 17 of wear device 14 is provided with an inner diameter slightly larger than the diametric dimensions of respective reduced end portions 19 and 23 of body 20 and end plate 21 so that wear device 14 may be easily slipped over the reduced end portion 19 when end plate 21 is removed. The inner ring 17 is dimensioned in width so that it snugly fits between side walls 24 and 25 of recess 18 upon thermal expansion thereof. Since the outer ring 16 has a greater coefficient of expansion than inner ring 17, outer ring 16 has a smaller dimension in width than inner ring 17 so that the outer ring is spaced from the side walls 24 and 25 of recess 18. Since the end edges of outer ring 16 are spaced from side walls 24 and 25 of recess 18, upon thermal expansion, outer ring 16 will not impinge against side walls 24 and 25 and buckle. In addition, since inner ring 17 is dimensioned in width to snugly fit between side walls 24 and 25 of recess 18, knocking of the wear device will be obviated when the piston is running cold.

The inner ring 17 and outer ring 16 are dimensioned in thickness in accordance with their respective coefficients of expansion to provide a combined thickness comparable to the thickness of the carbon wear device which it is to replace and a total radial expansion comparable to the radial expansion of a carbon wear ring of substantially the same thickness. Since the radial expansion of wear device 14 is substantially the same as the carbon ring which it replaces, wear device 14 will not bind against the surface of cylinder bore 12.

To replace a worn carbon wear ring, end plate 21 is removed by unthreading piston rod nut 26 from the end of piston rod 11 and unthreading bolts 22 from body 20 of piston 10. After end plate 21 is removed, the worn carbon wear ring is slipped off the reduced end portion 19 of the body 20. Thereafter, wear device 14 is passed over the reduced end portion 19 of the body 20, and end plate 21 is repositioned in abutment against body 20 of piston 10 with the reduced end portion 23 of end plate 21 disposed within the inner ring 17 of the wear device. The bolts 22 are then turned into the threaded bores in body 20 to secure end plate 21 against the latter, and nut 26 is turned upon piston rod 11 to secure the piston 10 to piston rod 11. With end plate 21 secured to body 20 of piston 10, wear device 14 is firmly secured in recess 18.

While the wear device 14 has been described as a replacement item for worn carbon wear rings, it is obvious that wear device 14 may be incorporated in a piston assembly at the time of initial assembly of the apparatus without departing from the scope and spirit of this invention.

It is apparent from the foregoing description that a novel wear device has been provided which is capable of substituting for a conventional carbon wear ring quickly and easily and without modification of the piston. It is a wear device having superior wearing characteristics to carbon wear rings as well as self-lubricating characteristics.

Although but one embodiment of the invention has been illustrated and described in detail, it is to be expressly understood that the invention is not limited thereto. Various changes can be made without departing from the scope and spirit of the invention as the same will now be understood by those skilled in the art.

I claim:

1. A wear device adapted to substitute for a carbon wear ring seated in an annular recess in a piston mounted for reciprocable movement within a cylinder bore comprising, an inner ring being substantially the same width as said recess, an outer ring mounted on the outer periphery of said inner ring and having a greater coefficient of expansion than said inner ring, said outer ring being narrower in width than said inner ring so that it may expand axially within said recess, the inner and outer rings having a combined maximum radial expansion substantially the same as the same thickness of carbon and a maximum axial expansion not greater than the width of said recess so that, upon expansion, the wear device will not bind on the cylinder bore.

2. A wear device adapted to substitute for a carbon wear ring seated in an annular recess in a piston mounted for reciprocable movement within a cylinder bore comprising, an inner ring being substantially the same width as said recess, an outer ring mounted on the outer periphery of said inner ring and having a greater coefficient of expansion than said inner ring, said outer ring having a relatively high resistance to wear and self lubricating characteristics, said outer ring being narrower in width than said inner ring so that it may expand within said recess without buckling, the inner and outer rings having a combined maximum radial expansion substantially the same as the same thickness of a carbon ring and a maximum axial expansion not greater than the width of said recess so that, upon expansion, the wear device will not bind on the cylinder bore.

3. A wear device adapted to seat within an annular recess in a piston mounted for reciprocable movement within a cylinder bore comprising, an inner ring being substantially the same width as said recess, an outer ring having a relatively high resistance to wear and self lubricating characteristics, said outer ring being mounted on the outer periphery of said inner ring and having a greater coefficient of expansion than said inner ring, said outer ring being narrower in width than said inner ring so that it may expand within said recess without buckling, said inner and outer rings having radial dimensions in relation to their respective coefficients of expansion so that the wear device has an outside dimension greater than the outside diameter of the piston and less than the diameter of the cylinder bore and upon maximum diametrical expansion and axial expansion of the wear device, said wear device will not bind against the cylinder bore.

References Cited in the file of this patent
UNITED STATES PATENTS
2,807,511 Fleming _____ Sept. 24, 1957